Sept. 22, 1953  G. BECKER ET AL  2,653,210
METHOD FOR PROVIDING METALLIC ARTICLES
WITH A PROTECTIVE WORK SURFACE LAYER
Filed Feb. 6, 1951
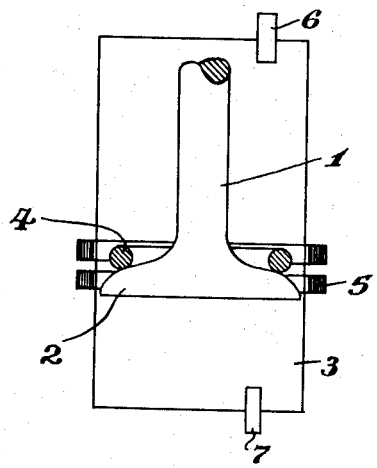
INVENTOR
Gottfried Becker
Fritz Steinberg
BY
Cushman, Darby & Cushman
ATTORNEY Patented Sept. 22, 1953

2,653,210

UNITED STATES PATENT OFFICE 2,653,210

METHOD FOR PROVIDING METALLIC ARTICLES WITH A PROTECTIVE WORK SURFACE LAYER

Gottfried Bécker, Buderich, near Dusseldorf, and Fritz Steinberg, Dusseldorf-Eller, Germany, assignors to Deutsche Edelstahlwerke, Krefeld, Germany, a corporation of Germany Application February 6, 1951, Serial No. 220,708

10 Claims. (Cl. 219—10)

This invention relates to methods for providing metallic articles with a superior work surface layer. There are many applications requiring metallic articles which have a work surface layer of a superior wear, corrosion and/or heat resistance than the body of the article. For instance, the valve members, such as valve discs of combustion-engine valves are in many cases provided with a special work surface layer covering along its seating surface in order to protect it against wear, corrosion and oxidation. In the past, a hard chromium plating or chromized surface stratum have been chiefly used for this purpose, but without properly achieving the desired protective action. It has also been known to provide such valve members with a metallic cover layer which was welded to the seat surface. However, the required welding procedure was cumbersome and time-consuming. It involved much manual skill and considerable final machining of the seating surface was required in order to give it to the proper dimensional accuracy.

An object of the invention is to overcome the difficulties heretofore encountered in providing metallic articles with a superior metallic work surface cover layer. Another object of the invention is to provide a method which leaves open a wide choice of suitable materials for such work surface cover layers and particularly, which makes it possible to utilize for this purpose structural materials, which, though they had the desired mechanical and chemical properties, could not be, at least without large difficulties, welded to the work surfaces of the base article that is to be protected.

The single figure of the drawing shows a side view of one form of means for providing metallic articles with a working surface layer. As shown in this figure, a valve body 1 is provided with a valve disc 2 and is insertable into a tube 3. The tube may be made of quartz or the like and of such dimensions as may be required. A ring 4, of the material to be welded on, is placed on the disc 2. An induction coil 5 is provided close to the disc or ring 4. The ring 4 is heated by means of this induction coil to such an extent that said ring is either welded on directly without melting or it is melted, whereby it is fused on. During the heating, protective gas is passed via the quartz tube 3 through the inlet 6 and the outlet 7.

In carrying out the process of the invention, for instance in its application to valve disc members, the covering material is placed on the article surface to be covered in the form of a ring or annulus and the ring is thereafter heated by an induction coil up to the welding temperature or up to the temperature at which the covering material melts. The process of the invention is based on the discovery that the induction currents may be readily controlled so as to heat the covering material to a higher temperature than the material of the body which is to be covered with the superior covering material. In the procedure of the invention, the covering material ring exerts a certain electrical shielding action and is heated at a higher rate than the material of the body which is to be covered thereby. In this manner, there is reached a condition at which the covering material is brought to a temperature at which it becomes welded to the relatively highly heated base body or at which it is united thereto by melting. The high temperature of the body to be covered is an important factor in assuring the desired effective union between the covering material and the base material.

The temperatures to which the cover ring on one hand and the base material on the other hand are raised may be readily controlled by choice of the electric coupling, the applied energy, and its frequency in relation to the covering material and that of the body to be covered.

It is good practice to form the closed cover ring as a wire ring or a sheet-ring. Such sheet-ring may have the form of a cap which fits to a more or less extent the surface of the base article or body to which it is to be united.

In instances where the covering material does not lend itself for shaping into a wire or sheet, it may be given the desired ring shape by compacting the powdered covering material into a wire ring or sheet ring and sintering the compacted powder body, in which case the sintered ring may be formed of alloy powders such as steel alloy powders, or out of powder mixtures which become alloyed only either in the course of sintering operation or in melting down the sintered cover ring when it is joined to the base body in the course of the combined sintering and uniting operations carried on in accordance with the principles of the invention. It is thus possible to provide work surface cover layers out of materials having the selected desired characteristics without regard to the machinability or, in general, the work-characteristics of the covering material. The invention provides thus for a wide latitude in the choice of compositions for the covering material and of its chemical and mechanical characteristics in relation to the service for which it is to be used. Thus, in many cases, for instance, in the case of valve discs, and also valve seat members, wear-resistant and/or heat and corrosion resistant steel or steel alloys may be used.

In practicing the invention it has been found desirable to maintain a neutral or inert or reducing atmosphere in the space within which the covering material is heated or molten as it is being joined to the base material. Such protective atmosphere may be provided by fully burned illuminating gas, although any other protective gas of proper characteristics may be used. The provision of a protective gas atmosphere assures the formation of a firm union of a work surface cover to the base, and impression of oxide formations. Furthermore, such protective atmosphere may also be so chosen as to increase the surface tension of the covering material as it is molten down in the process of joining it to the base material, the increased surface tension of the molten covering material being effective in preventing running off or spilling of the molten material.

If the ring of the covering material is heated to a welding temperature and thereby brought a plastic condition, as it is joined by welding to the base body, it is of advantage to use a suitably shaped die plunger or stamp member for giving the exterior surface of the welded-on work material ring the desired final shape. A die plunger of graphite may be used for this purpose. A similar shaping procedure may be also utilized where the ring of covering material is molten down as it is joined to the base surface, in which case the shaping plunger is applied to the exposed surface of the molten covering material as it freezes and solidifies, but before it is completely solidified. Such procedures reduce to a minimum machining operations required for giving the exterior of the covered work surface the final dimensional accuracy. To this end, the body to be covered, such as a valve disc member, may be placed together with the cover ring in a nonmetallic die structure which is surrounded by the induction coil. The cover ring is then molten down and is followed up by the shaping operation which is performed by the die plunger as the molten covering material becomes solidified.

Various other modifications of the arrangement and procedures of the invention described above may be used for providing a base body with a superior cover surface layer in accordance with the principles of the invention. However, in practicing the invention, it has been found essential that the cover ring and the base body to which it is to be applied shall be maintained coaxially with the surrounding induction coil by which they are heated to the temperature required for joining the cover ring to the base surface. This is required in order to prevent uneven heating of different parts or premature melting of any particular part of the cover ring and to assure that temperature is uniformly distributed with the desired temperature gradients within the cover ring and the corresponding parts of the base body to which it is being joined.

As explained, a distinct advantage of the process of the invention resides in the fact that it provides great freedom in the choice of the material to be applied to the work surface to be covered. The covering material layer may consist of metals, metal alloys, steels, steel alloys, hard metals, Stellite and the like. Furthermore, structural materials which because of their nature could not be used as a covering material, for instance because it could not be welded by a torch to the base material, as well as materials which could be joined by welding, may be used for providing a superior work surface cover in accordance with the principles of the invention.

Valve disc members provided with a work surface cover in accordance with the principles of the invention when used in high efficiency internal combustion engines have proven in actual practice to be of extremely high resistance to wear, heat and corrosion.

Various arrangements may be utilized for practicing the process of the invention. Thus, in providing valve discs with a work surface cover layer of the invention the following arrangement proved satisfactory. A ceramic cylinder which is closed at one end, or a supporting plate of ceramic material, is utilized as a support for the valve disc which is to be provided with the cover layer. The ceramic support body for the valve disc member is itself shaped as, or is combined with, a surrounding cylindrical housing of ceramic material which is provided with inlets and outlets for the protective gas atmosphere that is to be maintained in the interior while the enclosed cover ring and the body to be covered are heated to the temperature at which the ring is united to the body. Alternatively, it is sufficient to provide the ceramic housing with a connection for maintaining a vacuum in the interior of the housing while heating the cover ring and the covered body to the required raised temperature, although it is simpler to carry on the process of the invention within a protective gas atmosphere.

A relatively short ceramic cylinder may be utilized as a support or carrier for the valve disc that is to be provided with the cover. The short ceramic carrier serves primarily for the suppression of heat radiation and provides in addition a firm support for the valve disc and it also serves to prevent spillage of molten covering material as it is united to the valve disc base. In many cases, it is sufficient to make the carrier support in the form of a plate without or with only negligible borders protruding beyond the periphery of the valve discs. The exterior housing cylinder may be made out of ceramic material. It is also of advantage to use quartz or a temperature-resistant glass for the cylinder housing as it makes it possible to keep under observation the melt-on or the weld-on procedure carried on within the protective atmosphere. This makes it possible to take direct action in overcoming or compensating for any observed process irregularities. It is also possible to make the outer cylinder housing of non-magnetic metallic material in which case the cylindrical housing is provided with an axial slit for suppressing eddy currents and undesirable heating of the housing body. The slit in the housing body may be closed and sealed up with a suitable solid insulating cementing material such as ceramic material in order to prevent escape of the protective gas from the interior.

The induction coil—by means which the cover ring and the covered article are heated—is arranged so as to maintain them within the effective induction zone of the induction coil. The induction coil may be positioned either outside the housing cylinder or inside the housing cylinder in which case the induction coil is arranged to encircle the cover ring together with the article to be covered by the carrier support which holds them in their proper position within the induction zone.

If the induction coil is arranged outside the cylindrical housing, its electric coupling with the heated metallic elements is correspondingly reduced, but on the other hand, such arrangement results in a small interior space and smaller consumption of the protective gas. If the induction coil is positioned in the interior of the cylindrical housing, a better electrical coupling is obtained but such arrangement requires a larger housing interior and greater consumption of protective gas. When using a small housing requiring only a small volume of protective gas, each finished valve disc may be ejected from the interior of the housing at the end of each operating cycle, the escaping gas being burned without danger and without annoyance to the operating personnel.

It is of advantage to design the housing cylinder, with the carrier support and the valve elements held in its interior, so that they may be rotated as a unit within the induction coil while carrying on the process of the invention. The gas connections to the cylindrical housing may be readily arranged, so as to permit free axial rotation of the cylindrical housing and the elements carried thereby.

It will be apparent to those skilled in the art that the novel principles of the invention disclosed herein in connection with specific exemplifications thereof will suggest various other modifications and applications of the same. For instance, the cylindrical housing of the apparatus described above may have mounted therein the die plunger by means of which the material of the cover ring is pressed onto the article surface to be covered so as to give the exterior of the work surface cover the desired shape. It is also possible to provide for the introduction of the die plunger from the exterior of the housing after first releasing and removing a wall section of the housing. It is also obvious that various known automatic controls may be provided for feeding the metal parts to be worked upon into the interior of the housing and for ejecting them from the housing after the completion of each operating cycle of the type described above, as a part of a chain-like continuous automatic operating sequence. It is accordingly desired that in construing the breadth of the appended claims, they shall not be limited to the specific exemplifications of the invention described above.

We claim:

1. The method of uniting a metallic layer to a metallic article which includes shaping the metallic layer in the form of a ring, positioning the ring around the article, and electrically heating the ring and article by an induction coil embracing the ring so as to cause the ring to be united to the article as a protective layer therefor.

2. The method of uniting a metallic layer to a metallic article which includes shaping the metallic layer in the form of a closed ring, positioning the ring around the article, and electrically heating the ring and article by an induction coil embracing the ring to a greater extent than the main body of the article, so as to cause the ring to be united to the article as a protective layer therefor.

3. The method of uniting a metallic layer on a conical valve which includes shaping the layer in the form of a ring, positioning the ring around the valve, electrically heating the ring and article to a high frequency created by an induction coil embracing the ring so as to unite the ring to the conical face of the valve, and the valve being heated in said field to a lesser extent than the ring.

4. The method of uniting a metallic layer on a conical valve which includes shaping the layer in the form of a ring, positioning the ring around the valve, electrically heating the ring and article to a high frequency created by an induction coil embracing the ring, heating the ring and article in a non-oxidizing atmosphere, and heating the ring to a greater extent than the body of the valve and to a plastic condition, and pressing the heated material onto the valve so as to be united thereto and form a protective layer.

5. The method of uniting a metallic layer to a metallic valve which includes shaping the layer in the form of a ring, positioning the ring around the valve, electrically heating and melting the layer in a non-oxidizing atmosphere and in a high frequency electrical field created by an induction coil embracing the ring, controlling the heating so that the body of the valve is heated to a lesser extent and retains its solid form, and while the metallic layer is solidifying, pressing it onto the surface of the valve to provide a protective cover therefor.

6. The method of uniting a metallic layer to a metallic valve which includes shaping the layer in the form of a ring, positioning the ring around the valve, electrically heating and melting the layer in a non-oxidizing atmosphere and in a high frequency electrical field created by an induction coil embracing the ring, controlling the heating so that the body of the valve is heated to a lesser extent and retains its solid form, rotating the valve about its axis during the heating operation, and while the metallic layer is solidifying, pressing it onto the surface of the valve to provide a protective covering therefor.

7. The method of uniting a metallic article to a cover of different material than the article, which includes providing the article with a base surface, positioning a loop-shaped cover on the base surface, electrically heating the article and cover by an induction coil, passing through said coil alternating currents, controlling the frequency and intensity of the currents to cause the cover to be heated to a higher temperature than the article so as to bring the temperature of the cover and the temperature of the base surface to a fusion temperature at which they are united into an integral structure, and uniting the cover to the base surface of the article while maintaining at the same time the fusion temperatures.

8. The method of uniting a metallic article to a cover as called for in claim 7 which includes maintaining oxidation-suppressing conditions in the space within which the article and the cover are positioned while being heated to a fusion temperature so as to suppress oxidation of any exposed heated particles of the cover and the article.

9. The method of uniting a metallic article to a cover as called for in claim 7, which includes maintaining the cover and the article within the interior of a hollow metallic housing, and maintaining the interior of the housing in non-oxidizing condition while the cover and the article are heated to fusion temperatures.

10. The method of uniting a cover to a valve disc which includes positioning a loop-shaped cover on the valve disc, providing a solid non-metallic heat-insulated support for the valve disc, positioning the valve disc and cover within the inducing zone of an induction coil, passing alternating currents of electricity through said coil, controlling the frequency and intensity of the currents to cause the cover to be heated to a higher temperature than the valve disc so as to bring the temperature of the cover and the temperature of a portion of the valve disc to a fusion temperature at which they are united into an integral structure, and uniting the cover to the valve disc while being maintained at a high fusion temperature.

GOTTFRIED BÉCKER.
FRITZ STEINBERG.

References Cited in the file of this patent

UNITED STATES PATENTS

| Number | Name | Date |
|---|---|---|
| 1,745,886 | Bissell et al. | Feb. 4, 1930 |
| 1,998,496 | Fiedler | Apr. 23, 1935 |
| 2,290,338 | Koehring | July 21, 1942 |
| 2,528,758 | King | Nov. 7, 1950 |
| 2,553,925 | Lucas | May 22, 1951 |